Dec. 31, 1963   L. T. KNOCKE   3,115,955
AUTOMATIC BRAKE ADJUSTER
Original Filed Sept. 23, 1959

Inventor
LOUIS T. KNOCKE
by Hill, Sherman, Meroni, Gross & Simpson Attys

United States Patent Office 3,115,955
Patented Dec. 31, 1963

3,115,955
AUTOMATIC BRAKE ADJUSTER
Louis T. Knocke, Birmingham, Mich., assignor to Thompson Ramo Wooldridge Inc., Cleveland, Ohio, a corporation of Ohio
Original application Sept. 23, 1959, Ser. No. 841,816, now Patent No. 3,051,275, dated Aug. 28, 1962. Divided and this application Mar. 26, 1962, Ser. No. 182,477
1 Claim. (Cl. 188—79.5)

The present invention relates to improvements in vehicle brake construction and particularly to an improved brake adjusting mechanism for automatically positioning a brake shoe to compensate for brake lining wear.

The present application is a division of my copending application Serial No. 841,816, filed September 23, 1959, now Patent No. 3,051,275.

In vehicle brakes such as those utilized for automotive vehicles, the brake shoe carries a lining which is frictionally applied to a braking surface. The clearance between the lining and surface when the brake is released is preferably maintained constant and with wear of the lining adjustment must be made to move the shoe and lining closer to the surface in order to reduce the gap for improved brake application and operation. A feature of the invention is the provision of an automatic wear compensating or adjusting mechanism which gradually and uniformly compensates for brake lining wear maintaining an optimum gap between the brake lining and braking surface utilizing a mechanism that is reliable and effective in operation.

Accordingly, one of the objects of the invention is to provide an improved brake lining wear compensating mechanism which automatically controls the position of a brake shoe to maintain an optimum gap and compensate for brake lining wear.

Another object of the invention is to provide an improved brake shoe positioning mechanism which automatically responds to even the slightest wear of the lining to maintain the brake shoe gap accurately constant.

Another object of the invention is to provide a self-adjusting brake mechanism having a minimum number of parts for reliability and inexpensive construction.

Other objects and advantages will become more apparent with the teaching of the principles of the invention in connection with the disclosure of the preferred embodiments thereof in the specification, claims and drawings, in which:

As shown on the drawings.

Figure 1:
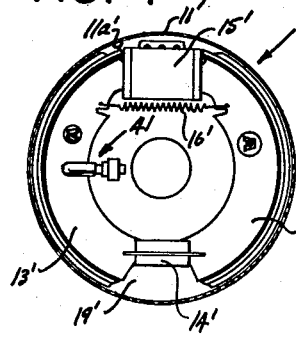
FIGURE 1 is a vertical sectional view taken through a brake drum, and illustrating a braking assembly of the type embodying the principles of the present invention.
Figure 2:
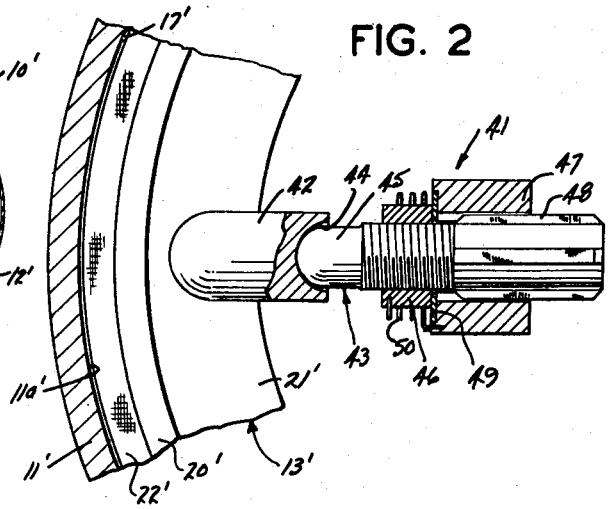
FIGURE 2 is an enlarged fragmentary elevational view of the brake adjusting mechanism of FIGURE 1, illustrating parts broken away for purposes of clarity and showing the position of the parts when the brake is not applied.
Figure 4:
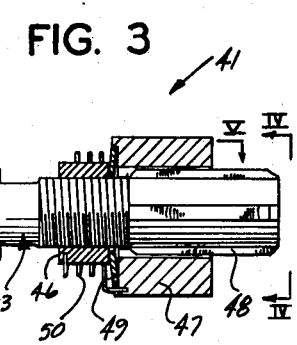
FIGURE 4 is a detailed elevational view taken substantially along line IV—IV of FIGURE 3.

In FIGURE 1, a braking assembly 10' includes a brake drum 11' having an inner brake surface 11a' with shoes 12' and 13' connected at 14' at their lower ends and expanded by a hydraulic cylinder 15'. The shoes are drawn together by a tension spring 16'. As illustrated in FIGURE 2, the shoe 13' has an arcuate outer plate 20' with an inner radially extending flange 21' and a lining 22' attached to the outer surface of the plate 20' with a gap 17' between the lining and the brake surface 11a' when the brake is released.

The brake adjusting mechanism 41 is illustrated as operating on the shoe 13' and the position of this mechanism may be changed and individual mechanisms may be provided for each brake shoe. The shoes in the brake adjusting mechanism are supported on a stationary plate 19' on the vehicle.

Figure 3:
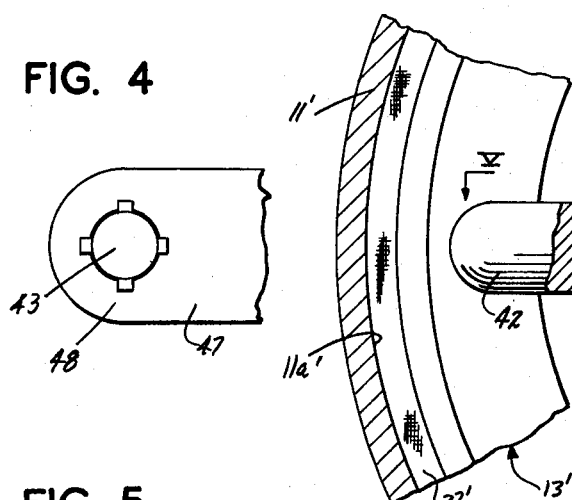
FIGURE 3 is a fragmentary view similar to FIGURE 2 showing the position of the parts when the brake is applied.
Figure 5:
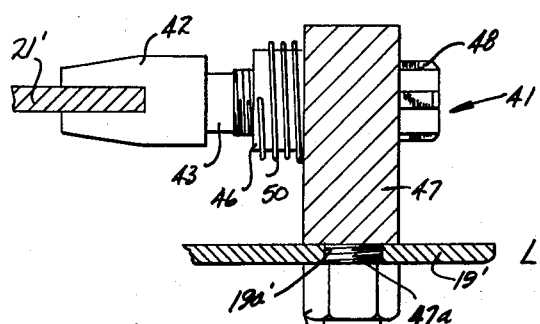
FIGURE 5 is a sectional view taken substantially along line V—V of FIGURE 3.

As illustrated in FIGURES 2 through 5, a connector 42 is secured to the flange 21' of the brake shoe for engagement by a follow-up threaded bolt member. The follow-up bolt member has a rounded end 45 and is received by a concave socket 44 in the connector 42. The rounded end and socket provide a universal joint action. Threaded on the bolt is a driving member in the form of a driving nut 46 which is rotated in response to wear of the brake lining 22' for movement of the brake shoe beyond the brake applied position, to maintain contact between end 45 and concave socket 44 (FIGURE 3). The minimum desired gap 17' is maintained by compressing spring washer 49 from its fully expanded position (FIGURE 3) to its flat position (FIGURE 2). The follow-up bolt 43 is non-rotatably mounted in a support or mount 47 having a threaded end 47a extending through a hole 19a' in the plate 19' and receiving a nut 51 to hold it on the plate 19'. The mount 47 is internally splined to receive splines 48 of the follow-up bolt 43.

The drive nut 46 is continually urged from a first position, as shown in FIGURE 2, to a second position, as shown in FIGURE 3 by a conical spring washer 49 which seats in a recess in the mount 47. The first position of FIGURE 2 corresponds with the brake release position, and the second position of FIGURE 3 corresponds to the brake applied position.

The drive nut 46 is torsionally urged by a coil torsion spring 50 to drive the nut in a direction to move the follow-up bolt 43 toward second position. The spring washer 49 is shown fully expanded in FIGURE 3, and if due to wear of the brake lining 22; the shoe 13' moves beyond the second position, as limited by the fully expanded position of the spring washer 49, a space will tend to be created between the head 45 of follow-up bolt and the socket 44 to release the pressure between the nut 46 and the bolt thus permitting the nut to rotate and drive the bolt forwardly. This changes the location of the position where the brake shoe is stopped when it is released. In other words the release position of the brake shoe has shifted further to the left of the first position of the follow-up bolt and drive nut.

In operation, as illustrated in FIGURES 1 through 5, the clearance gap 17' is originally established by the position of the recess in the mount 47, and the expansion movement of the conical spring washer 49. As the operator applies the brake, the brake shoe moves from the brake release position of FIGURE 2 to the braking position of FIGURE 3, and the spring washer 49 expands so that the follow-up bolt 43 moves with the shoe. As the brake shoe lining 22' wears, the brake shoe will move beyond the normal braking position so that the conical washer 49 will reach its fully expanded position and will no longer maintain an axial force against the nut 46. When the nut is no longer urged axially the friction of its threads reduces so that it is driven in rotation by the torsion spring 50 to move the follow-up bolt 43 axially to maintain an axial force between the threads of the follow-up bolt 43 and the nut 46. This of course drives the bolt 43 axially establishing a new retracted position for it, and maintaining the standard or constant gap 17' between the brake shoe and brake drum.

Thus it will be seen that I have provided an improved automatic brake adjusting mechanism which meets the objectives and advantages hereinbefore set forth. The mechanism is reliable in operation, requires a minimum number of parts and is well adapted for continuous operation without servicing for the full life of the brake lining.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

An automatic brake adjusting mechanism for positioning a brake shoe comprising, a threaded follow-up bolt member axially reciprocal in the direction of movement of a brake shoe, a concave bolt receiving member adapted for attachment to the brake shoe and having a bolt member receiving socket therein, said bolt member having a fragmentary spherical end for seating in said socket, a fixed mount adapted for mounting on the back plate of a shoe assembly, a spline opening through said mount slidably receiving the bolt member, a conical disk spring surrounding the bolt member and seated against a side surface of the mount in a position between the mount and nut member and urging the nut and bolt member axially toward the shoe, said bolt member and nut member movable between a first position wherein the brake shoe engages a brake drum, and a second position wherein the brake shoe is retracted, said conical disk spring being flattened and seated on the mount in said first position so that the bolt member will stop movement of the shoe away from the brake drum, said conical disk spring being fully expanded at said second position so that the shoe will move beyond said second position and tend to move away from the bolt member with wear, and a torsional spring surrounding said nut and anchored at one end to said fixed mount for urging the nut member in rotation and holding the bolt member against the shoe when the shoe moves beyond the second position with wear.

References Cited in the file of this patent

UNITED STATES PATENTS

| | | |
|---|---|---|
| 2,196,799 | Keplinger | Apr. 9, 1940 |
| 2,241,163 | Rouch | May 6, 1941 |
| 2,818,143 | Phillips | Dec. 31, 1957 |